C. H. KAHRS.
FISHING NET.
APPLICATION FILED SEPT. 15, 1909.
972,383.
Patented Oct. 11, 1910.
3 SHEETS—SHEET 1.
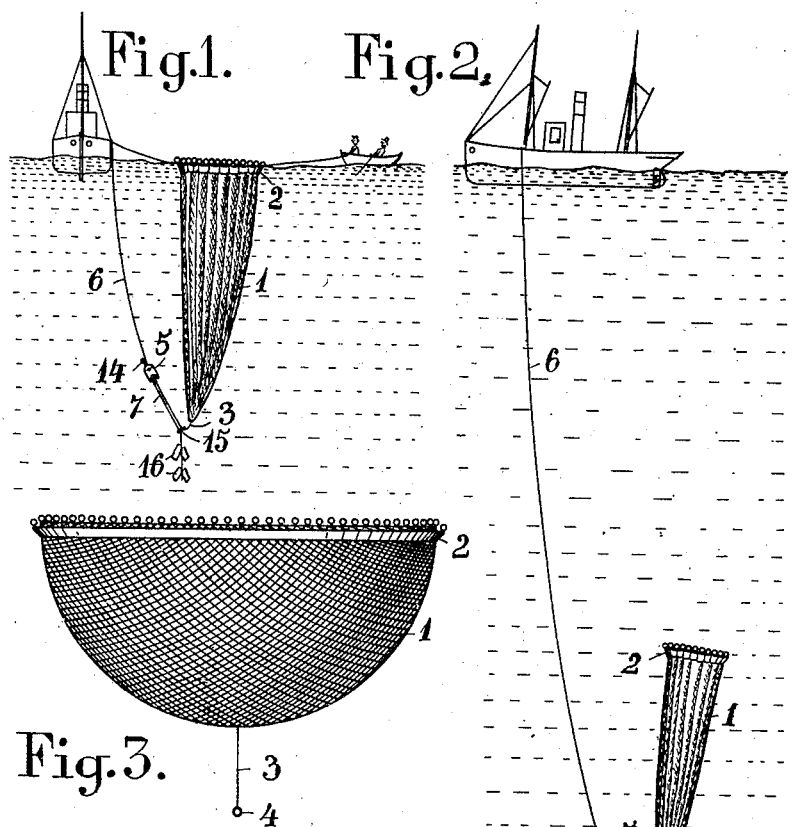
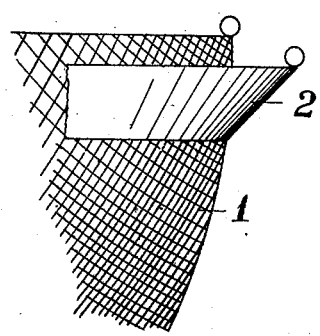
Witnesses.
Inventor.
Christen Heiberg Kahrs

C. H. KAHRS.
FISHING NET.
APPLICATION FILED SEPT. 15, 1909.

972,383.

Patented Oct. 11, 1910.

3 SHEETS—SHEET 2.

Witnesses.
Jesse N. Lutton
B. V. Sommers

Inventor.
Christen Heiberg Kahrs
by Henry Orth Jr.
Atty.

C. H. KAHRS.
FISHING NET.
APPLICATION FILED SEPT. 15, 1909.

972,383.

Patented Oct. 11, 1910.
3 SHEETS—SHEET 3.

Witnesses.

Inventor.
Christen Heiberg Kahrs

UNITED STATES PATENT OFFICE.

CHRISTEN HEIBERG KAHRS, OF CHRISTIANIA, NORWAY.

FISHING-NET.

972,383.   Specification of Letters Patent.   Patented Oct. 11, 1910.

Application filed September 15, 1909. Serial No. 517,872.

*To all whom it may concern:*

Be it known that I, CHRISTEN HEIBERG KAHRS, a subject of the King of Norway, residing at Christiania, Norway, have invented certain new and useful Improvements in Fishing-Nets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to fishing nets and more especially to purse nets adapted to be lowered into the water by means of weights and thereafter allowed to rise to the surface, the weights being loosened from the net and the latter raised by means of floats.

Figure 5:
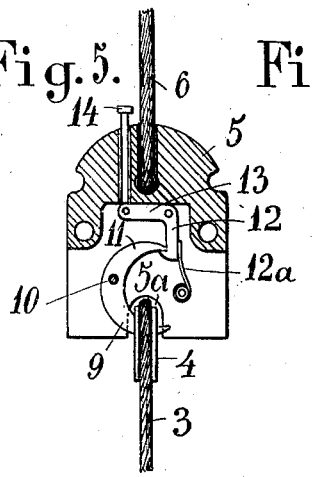
Figure 6:
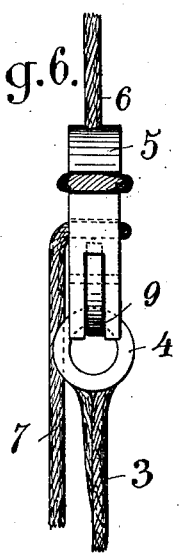
Figure 7:
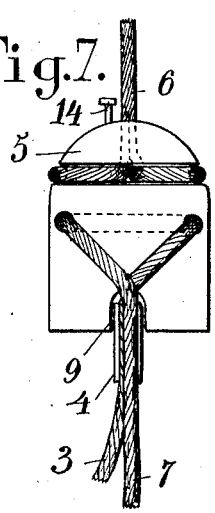
Figure 8:
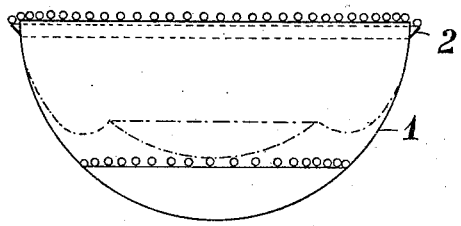
Figure 9:
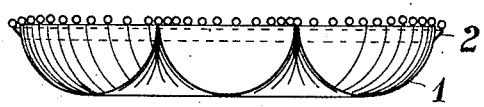
Figure 10:
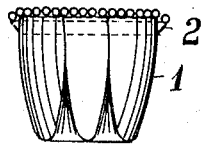
Figure 11:
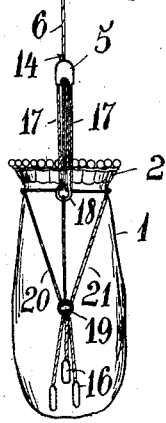
Figure 12:
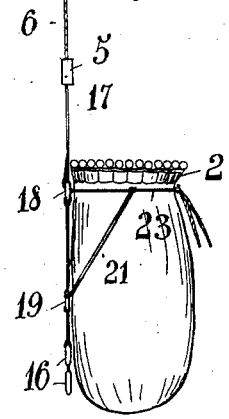
Figure 13:
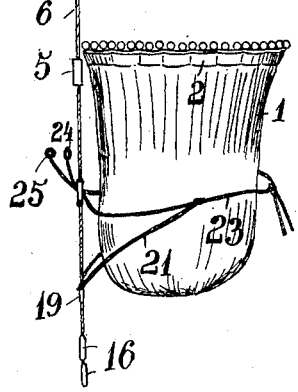
Figure 14:
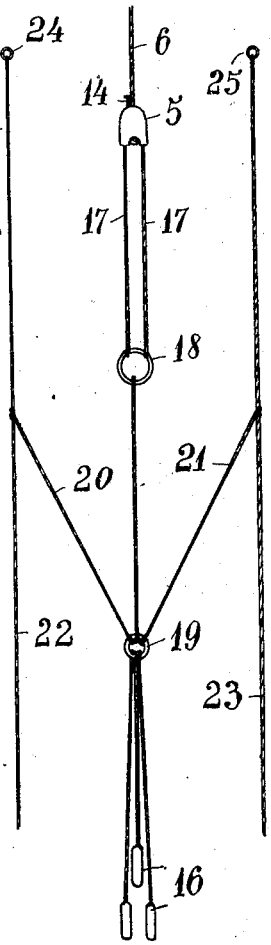

In the accompanying drawings, Figures 1 and 2 illustrate the way in which such nets are used and manipulated, Fig. 1 showing the net being set out and Fig. 2 showing the net in its lowered position ready to be disengaged from the weights. Fig. 3 shows the net spread. Fig. 4 is a detail of the net. Figs. 5, 6 and 7 are vertical section, side and end views respectively, of the device used for holding and disengaging the weights. Fig. 8 is a vertical section through a preferred form of net. Figs. 9 and 10 are views illustrating how the net folds up, when it rises to the surface. Figs. 11 and 12 are front and side views respectively of the net ready to be lowered. Fig. 13 shows the form of the net the moment the weights are released, and Figs. 14 and 15 show the roping with the weights.

The net 1 is preferably of semispherical form and of considerable size. When lowered, it folds together by the pressure of the water as shown in Figs. 1 and 2, or is held together by ropes as shown in Figs. 11 and 12. When released from the weights the net commences to rise and in order that it may rapidly spread to its open spherical shape to capture the fish coming in its way, I provide a spreader as 2 either in the form of a conical flange made for instance of sail cloth, or in the form of a number of boards held in a sloping position near the edge of the net. The spreader as well as the edge of the net is provided with floats.

As stated the net is drawn down by means of suitable weights. These may be applied in the manner shown in Figs. 1 and 2, in which case the net has a rope 3 provided with a ring 4 fastened to its lowest point by means of which rope the weights 16 hanging in the rope 7 may be temporarily attached to the net, the rope 3 being passed through a ring 15 fastened to the rope 7 and hung on a catch in a block 5, which connects the rope 7 with the rope 6. Or the weights may be arranged in the manner shown in Fig. 13. This arrangement is used in connection with the net shown in Fig. 8, which has a ring of floats attached on the inside of the net between the bottom and the top for the purpose of causing the net to take the form indicated by dotted lines, Fig. 8, when rising through the water and the form shown in Fig. 9, when it arrives at the surface. The object of this arrangement is to make the net more effective, especially when used in shallow waters. By these means it will be seen that the bottom of the net is brought much nearer to the upper edge.

Figure 15:
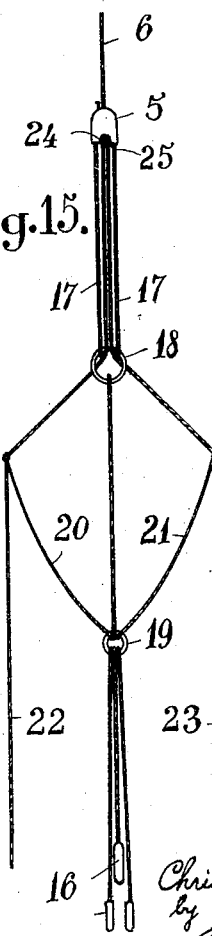

The arrangement of ropes used with the net just described is illustrated in Figs. 11 to 15. From the block 5 on the rope 6 is suspended, by means of ropes 17, a ring 18 and to this ring a rope is attached, carrying the ring 19, in which the weights 16 hang. From the ring 19 two ropes 20, 21 extend terminating in smaller rings 24, 25; to the ropes 20, 21 are attached ropes 22, 23. The net having arrived at the surface will contract itself to the form shown in Fig. 10. When it is to be lowered again, the ropes 20, 21 are with their rings 24, 25 passed through the ring 18, as shown in Fig. 15, and hung on the catch in the block 5. The ropes 22, 23 are thereupon laid around the net below the spreading flange and tied as shown in Fig. 12. When the net has been lowered and is to be freed from the weights, the catch is released as hereinafter described, and the two rings will fall and slip through the ring 18, whereby the net will be free and commence rising as shown in Fig. 13.

The block with the catch may be constructed as shown in Figs. 5, 6 and 7. The block 5 is attached to the rope 6 and from the block is suspended the rope 7 (or in case the device shown in Figs. 11–15 is used, the ropes 17). The catch consists of a crescent-shaped lever which is pivoted in a cavity in the block on a pin 10; the arm 9 of the lever serves as a hanger for the ring 4, there being a slot 5ª in the block, into which the ring is pushed, whereby it is prevented from sliding off the arm 9 by the arm 11 which rests against a hooked pawl 12, which is pressed against the arm 11 by means of a spring 12ª. The hooked pawl 12 forms one arm of a bell crank, the other arm 13 of which carries a pin with a knob 14, projecting above the block.

When the catch is to be released, a sliding weight (not shown) on the rope 6 is allowed to pass down and will hit the pin 14, whereby the hooked pawl will be pressed out of engagement with the catch lever; the latter will then turn upon its pin and release the ring 4.

What I claim is:—

1. A fishing-net provided with floats along its upper edge, weights to draw the net downward, means to release said weights from the net, and means connected with the net to automatically spread the net by the rising of the latter in the water.

2. A purse-shaped fishing-net having floats along its upper edge, weights to draw the net downward, means to release said weights from the net, and a conical flange attached near the opening of the net to spread the net as it rises.

3. A purse-net having floats along its upper edge, floats between the edge and the bottom, and a conical flange of sail-cloth or similar material near the edge for the purpose specified.

4. The combination with a purse net provided with floats thereon capable of raising the net through the water, of means connected with the net to automatically spread the opening of the net by the rising of the net in the water, a rope having weights capable of drawing the net down against the action of the floats, and means to detachably connect the rope to the net.

5. The combination with a purse net provided with floats capable of raising the net through the water and with means whereby it is spread open through the action of the water, of a rope having weights capable of drawing the net down against the action of the floats, two ropes attached to the weighted rope and adapted to be tied around the net, two other ropes attached respectively to each of the aforesaid ropes, a ring in each end of the latter ropes, a ring of larger diameter secured to the weighted rope, a block on the latter above the ring, a catch and a release mechanism in the block, said catch adapted to serve as a hanger for the two rings, which are threaded through the ring on the weighted rope in order that the ropes carrying the rings shall be contracted around the net.

6. The combination with a purse net provided with floats capable of raising the net through the water and with means whereby it is spread open through the action of the water, of a rope having weights capable of drawing the net down against the action of the floats, means whereby said rope may be temporarily attached to the net, a block in the weighted rope, a catch in the block for holding the rope attached to the net and a releasing mechanism comprising a sliding weight adapted to slide on the weighted rope to hit the releaser.

In testimony that I claim the foregoing as my invention, I have signed my name in presence of two subscribing witnesses.

CHRISTEN HEIBERG KAHRS.

Witnesses:
 HENRY BORDEWICH,
 AUG. OLSEN.